United States Patent Office 2,694,703
Patented Nov. 16, 1954

2,694,703

PRODUCTION OF 4-ARYLAZO-5-PYRAZOLONES

Bruce Graham, Rochester, N. Y., assignor to Eastman Kodak Company, Rochester, N. Y., a corporation of New Jersey No Drawing. Application January 31, 1952, Serial No. 269,347

9 Claims. (Cl. 260—163)

This invention relates to a method of preparing 4-arylazo-5-pyrazolone coloring materials.

The use of 4-azo derivatives of 5-pyrazolone as colored couplers in color photography is well known (Hanson U. S. Patent 2,449,966; Glass, Vittum and Weissberger U. S. Patent 2,455,170). These compounds have been prepared by azo coupling a diazonium salt in the 4-position of the 5-pyrazolone. This method of preparation has certain disadvantages. The pyrazolone intermediates used are sometimes difficult to prepare, particularly in a pure state and must be purified from mixtures with other compounds. Moreover, the pyrazolone intermediates are usually difficultly soluble in organic solvents.

It is, therefore, an object of the present invention to provide a novel method for the preparation of 4-arylazo-5-pyrazolones. A further object is to provide a method for the preparation of 4-arylazo-5-pyrazolones which does not depend upon the use of pyrazolone intermediates. Other objects will appear from the following description of my invention.

These objects are accomplished by reacting the aryl diazonium halide with a 5-acyloxy pyrazole to produce the 4-arylazo-5-pyrazolone. I have also found that a similar treatment of 5-pyrazolones having a 4-acyl substituent will produce the 4-arylazo-5-pyrazolone. In fact, even the diacylated homologs, i. e., 4-acyl-5-acyloxypyrazoles, yield 4-arylazo-5-pyrazolones in the coupling reaction.

Treatment of these intermediates with the aryl diazonium salt to produce the 4-arylazo-5-pyrazolone is shown schematically in the following:

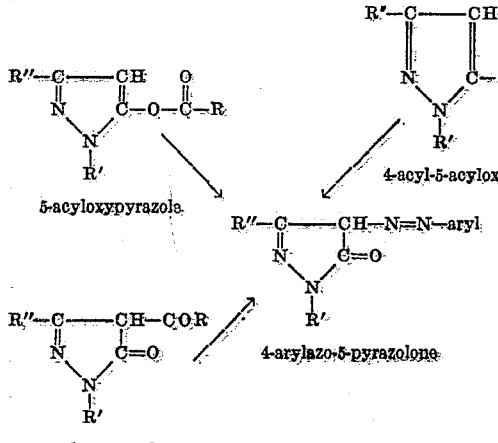

In these formulas R and R' represent alkyl or aryl groups and R" represents alkyl, aryl, amino or substituted amino groups.

The 5-acyloxy pyrazoles are known compounds (Weissberger and Porter, Journal of American Chemical Society 65, 1495 (1943)). The 5-acyloxy-3-acylamino pyrazoles as well as the 4-acyl-3-acylamino-5-pyrazolones are produced when 4-amino-5-pyrazolones are acylated with acid chlorides or anhydrides to make compounds useful as color couplers. These compounds have hitherto been considered as contaminants in the production of 3-acylamino-5-pyrazolones. The present invention makes it possible to treat a crude acylation mixture containing 3-acylamino-5-pyrazolone, 3-acylamino-4-acyl-5-pyrazolone, and 3-acylamino-5-acyloxypyrazole with an aryl diazonium salt to yield a single 3-acylamino-4-arylazo-5-pyrazolone.

Any aryl diazonium salt generally used to form azo dyes by coupling with active methylene compounds or with naphthols and phenols can be used in this synthesis.

My invention will be further illustrated by reference to the following examples, which are illustrative only.

EXAMPLE I

*Preparation of acyl derivatives of 1-phenyl-3-methyl-5-pyrazolone (I).*—C. f. J. Prakt. Chem. 55, 145, 1897).

Twenty-five grams of I were dissolved in 150 cc. of acetic anhydride and the solution refluxed for one hour. The acetic anhydride was removed and the residue distilled at 122°/1 mm., yielding 22 g. of 1-phenyl-3-methyl-5-acetoxypyrazole, II. Anal.—Calc'd. for $C_{12}H_{12}N_2O_2$: C, 66.7; H, 5.6; N, 13.0. Found: C, 66.5; H, 5.6; N, 13.2. II is easily hydrolyzed to I by solution in cold 5% alcoholic potassium hydroxide.

Twenty-five grams of I were dissolved in a solution of 125 cc. of acetic anhydride and 25 g. of sodium acetate, and the mixture refluxed for one hour. The cooled solution was poured into 800 cc. of cold water. The resulting brown oily solid is collected and triturated with 50 cc. of methyl alcohol, producing 11.2 g. of solid, melting

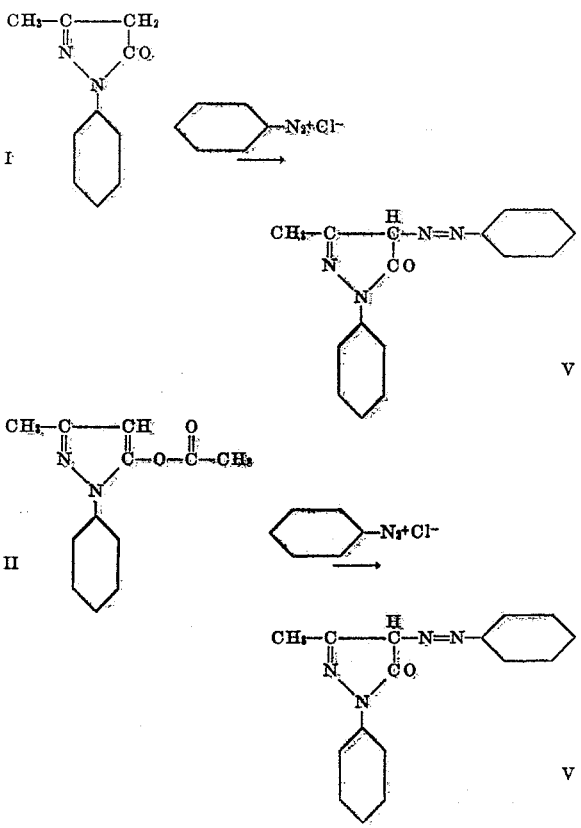

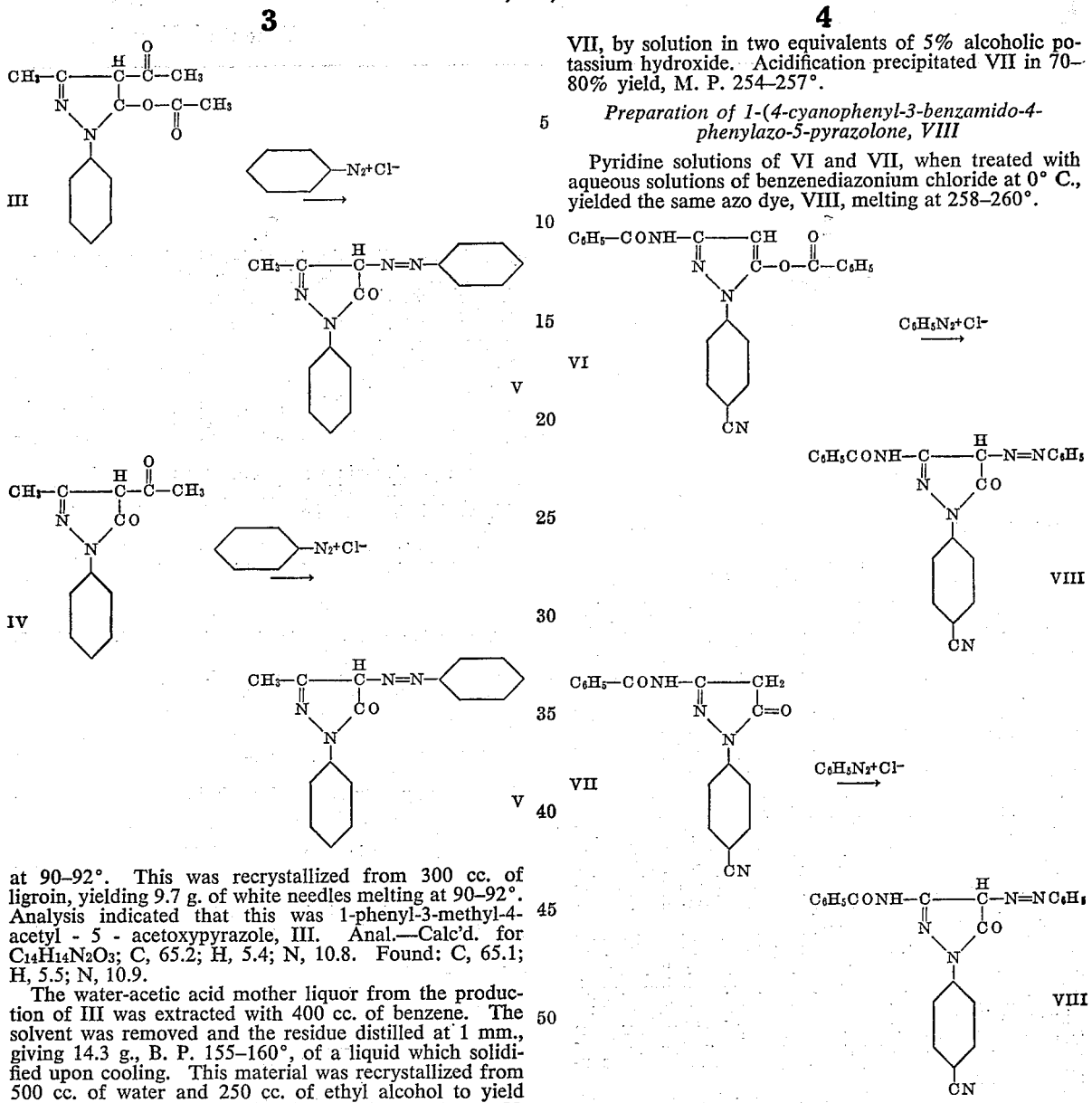

at 90–92°. This was recrystallized from 300 cc. of ligroin, yielding 9.7 g. of white needles melting at 90–92°. Analysis indicated that this was 1-phenyl-3-methyl-4-acetyl - 5 - acetoxypyrazole, III. Anal.—Calc'd. for $C_{14}H_{14}N_2O_3$: C, 65.2; H, 5.4; N, 10.8. Found: C, 65.1; H, 5.5; N, 10.9.

The water-acetic acid mother liquor from the production of III was extracted with 400 cc. of benzene. The solvent was removed and the residue distilled at 1 mm., giving 14.3 g., B. P. 155–160°, of a liquid which solidified upon cooling. This material was recrystallized from 500 cc. of water and 250 cc. of ethyl alcohol to yield 12.4 g. of 1-phenyl-3-methyl-4-acetyl-5-pyrazolone, IV, melting at 61–62° before drying and at 66–67° after being dried at 60° and 1 mm. Anal.—Calc'd. for $C_{12}H_{12}N_2O_2$: C, 66.7; H, 5.6; N, 13.0. Found: C, 67.1; H, 5.5; N, 12.9. III was readily hydrolyzed to IV by cold alcoholic potassium hydroxide. IV was not hydrolyzed to I by cold bases.

*Azo coupling of acyl derivatives of 1-phenyl-3-methyl-5-pyrazolone*

One hundredth mole quantities of I, II, III, and IV, each dissolved in 50 ml. of pyridine, were treated at 0° C. with an aqueous solution of benzenediazonium chloride (0.011 mole each). All four couplers produced in good yield the same azo dye, i. e., 1-phenyl-3-methyl-4-phenylazo-5-pyrazolone, V, M. P. 155° (cf. Knorr, Ann., 238, 183).

EXAMPLE II

*Preparation of 1-(4-cyanophenyl)-3-benzamido-5-benzoxypyrazole, VI, and 1-(4 - cyanophenyl) - 3 - benzamido-5-pyrazolone, VII*

1-(4-cyanophenyl)-3-amino-5-pyrazolone (109 g.) was dissolved in 1600 cc. of dry pyridine. To this was added, at temperatures below 40°, 157 g. of benzoyl chloride. After one hour the solution was diluted with 3 liters of water. The precipitate was collected, washed with water, and dried. The yield of 1-(4-cyanophenyl)-3-benzamido-5-benzoxypyrazole, VI, melting at 184–187°, was 185 g. (83%). This compound was converted to 1-(4-cyanophenyl)-3-benzamido-5-pyrazolone, VII, by solution in two equivalents of 5% alcoholic potassium hydroxide. Acidification precipitated VII in 70–80% yield, M. P. 254–257°.

*Preparation of 1-(4-cyanophenyl-3-benzamido-4-phenylazo-5-pyrazolone, VIII*

Pyridine solutions of VI and VII, when treated with aqueous solutions of benzenediazonium chloride at 0° C., yielded the same azo dye, VIII, melting at 258–260°.

EXAMPLE III

*Preparation of acyl derivatives of 1-(4-nitrophenyl)-3-methyl-5-pyrazolone, IX*

Twenty-five grams of IX were dissolved in a solution of 10 g. of sodium acetate in 460 cc. of acetic anhydride and the mixture was refluxed for fifteen minutes. The cooled solution yielded 18.5 g. of 1-(4-nitrophenyl)-3-methyl-4-acetyl-5-pyrazolone, X, M. P. 198–202°. The melting point after recrystallization from acetic acid was 202–203.5°. Analysis—Calc'd. for $C_{12}H_{11}N_3O_4$: C, 55.2; H, 4.2; N, 16.1. Found: C, 55.3; H, 4.2; N, 16.1. X was not hydrolyzed to IX by cold bases.

A similar run without the addition of sodium acetate yielded 1 - (4 - nitrophenyl)-3-methyl-5-acetoxypyrazole, XI. This was isolated by drowning the reaction mixture in water and collecting the product, 25 g., M. P. 112–113°. After recrystallization from benzene, XI melted at 114–116°. Analysis—Calc'd. for $C_{12}H_{11}N_3O_4$: C, 55.2; H, 4.2; N, 16.1. Found: C, 55.2; H, 4.1; N, 16.3.

XI was readily hydrolyzed to IX by cold alcoholic potassium hydroxide.

*Azo coupling of acyl derivatives of 1-(4-nitrophenyl)-3-methyl-5-pyrazolone, IX*

Pyridine solutions of X and XI, when treated at 0° with an aqueous solution of 2,5-dichlorobenzenediazonium chloride, both yielded 1-(4-nitrophenyl)-3-methyl-4-(2,5-dichlorophenylazo)-5-pyrazolone, XII, M. P. 259–261°.

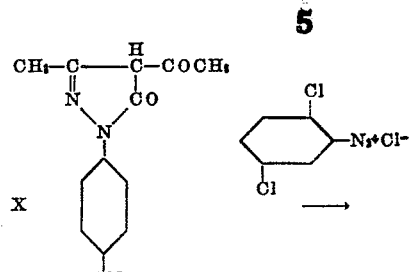

X

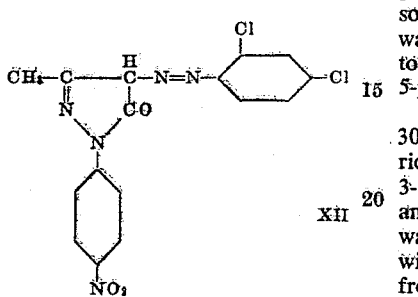

XII

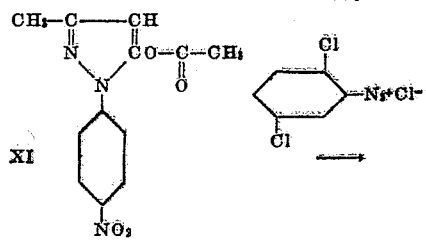

XI

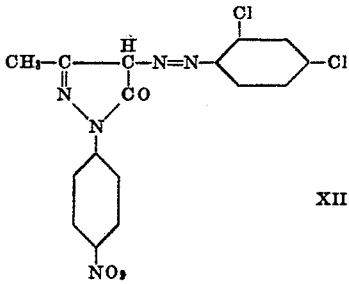

XII

EXAMPLE IV

*Preparation of acyl derivatives of 1-phenyl-3-amino-5-pyrazolone, XIII*

A boiling solution of XIII (8.75 g.) in 100 cc. of acetonitrile was treated with 34.2 g. of 2,4-di-tert-amylphenoxyacetyl chloride. After four hours at reflux the solvent was removed. The resulting white solid was washed with solid acetonitrile or petroleum ether or both to yield 1-phenyl-3-(2,4-di-tert-amylphenoxyacetamido)-5-pyrazolone, XIV, M. P. 204–206°.

A pyridine solution of XIV, when treated with a 30% molar excess of 2,4-di-tert-amylphenoxyacetyl chloride at room temperature for 20 hours, yielded 1-phenyl-3-(2,4 - di - tert - amylphenoxyacetamido)-4-(2,4-di-tert-amylphenoxyacetyl)-5-pyrazolone, XV. The product was obtained by drowning the pyridine solution slowly with water. The solid was collected and recrystallized from ligroin. It was polymorphous, having a melting range 140–150° C. Recrystallization from acetic acid resulted in a solvated product melting at 121–123°. Analysis—Calc'd. for $C_{45}H_{61}N_3O_5:C_2H_6O$: C, 72.0; H, 8.4; N, 5.4. Found: C, 72.2; H, 8.5; N, 5.4.

*Azo coupling of acyl derivatives of 1-phenyl-3-amino-5-pyrazolone, XIII*

Pyridine solutions of XIV and of XV, when treated with aqueous benzenediazonium chloride, yielded the same azo dye, 1-phenyl-3-(2,4-di-tert-amylphenoxyacetamido)-4-phenylazo-5-pyrazolone, XVI–A, M. P. 175–177°.

If 2-chlorobenzenediazonium chloride was used in the coupling reaction, 1-phenyl-3-(2,4-di-tert-amylphenoxyacetamido)-4-(2-chlorophenylazo)-5-pyrazolone, XVI–B, M. 203–205°, was produced in good yield from both XIV and XV. Analysis—Calc'd. for $C_{33}H_{38}ClN_5O_3$: C, 67.4; H, 6.5; N, 11.9. Found: C, 67.4; H, 6.2; N, 12.3.

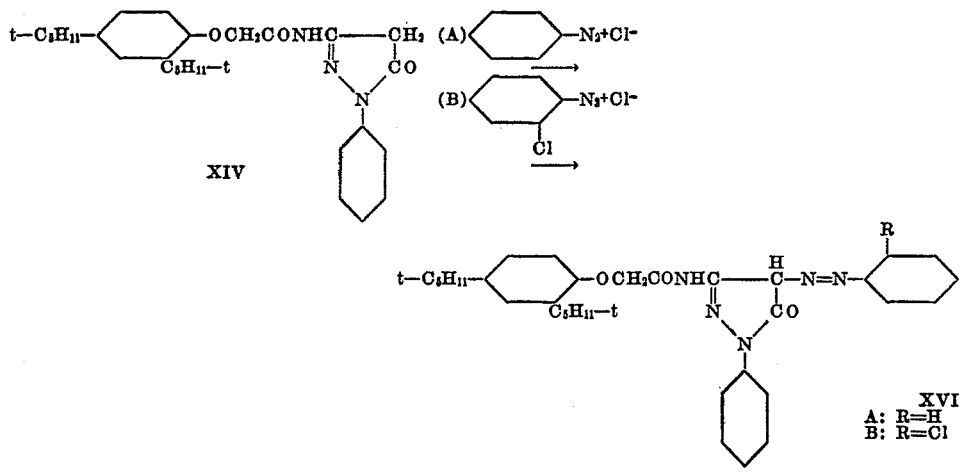

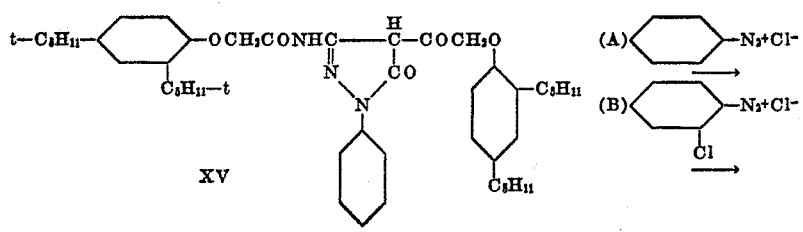

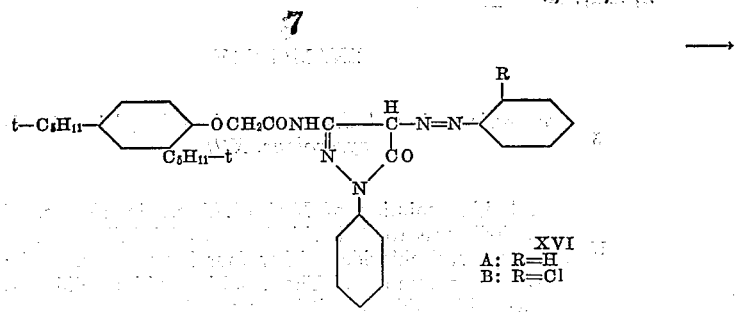

XVI
A: R=H
B: R=Cl

It will be understood that the examples and modifications included herein are illustrative only, and that my invention is to be taken as limited only by the scope of the appended claims.

What I claim is:

1. The method of preparing a 4-arylazo-5-pyrazolone which comprises condensing an aryldiazonium chloride with a compound selected from the group consisting of 4-carboxyacyl - 5 - pyrazolones, 5-acyloxypyrazoles, and 4-carboxyacyl-5-acyloxypyrazoles at the 4-position of said compound.

2. The method of preparing a 4-arylazo-5-pyrazolone which comprises condensing an aryldiazonium chloride with a 5-carboxyacyloxypyrazole at the 4-position of said pyrazole.

3. The method of preparing a 4-arylazo-5-pyrazolone which comprises condensing an aryldiazonium chloride with 1-phenyl-3 - (2',4' - diamylphenoxy)-acetamido-4-(2'',4''-diamylphenoxyacetyl)-5-pyrazolone at the 4-position of said pyrazolone.

4. The method of preparing a 4-arylazo-5-pyrazolone which comprises condensing an aryldiazonium chloride with a 5-benzoxypyrazole at the 4-position of said pyrazole.

5. The method of preparing a 4-arylazo-5-pyrazolone which comprises condensing an aryldiazonium chloride with 1-(4-cyanophenyl)-3-benzamido-5-benzoxypyrazole at the 4-position of said pyrazole.

6. The method of preparing a 4-arylazo-5-pyrazolone which comprises condensing an aryldiazonium chloride with 1-p-nitrophenyl-3-methyl-5-acetoxypyrazole at the 4-position of said pyrazole.

7. The method of preparing a 4-arylazo-5-pyrazolone which comprises condensing an aryldiazonium chloride with a 4-carboxyacyl-5-pyrazolone at the 4-position of said pyrazolone.

8. The method of preparing a 4-arylazo-5-pyrazolone which comprises condensing an aryldiazonium chloride with 1-p-nitrophenyl-3-methyl-5-pyrazolone at the 4-position of said pyrazolone.

9. The method of making a 4-phenylazo-5-pyrazolone which comprises treating a 5-acyloxypyrazole dissolved in pyridine, with an excess of a benzenediazonium chloride at about 0° C. and allowing the reaction mixture to stand at room temperature for at least one hour, thereby converting said pyrazole to said pyrazolone.

No references cited.